(12) United States Patent
Bailey et al.

(10) Patent No.: US 6,370,795 B1
(45) Date of Patent: Apr. 16, 2002

(54) ARTICLE HANDLING APPARATUS

(75) Inventors: Thomas William Bailey; Andrew John Cleall; Brian Hill, all of Coventry (GB)

(73) Assignee: Molins PLC, Milton Keynes (GB)

( * ) Notice: Subject to any disclaimer, the term of this patent is extended or adjusted under 35 U.S.C. 154(b) by 0 days.

(21) Appl. No.: 09/402,391
(22) PCT Filed: Apr. 6, 1998
(86) PCT No.: PCT/GB98/01009
  § 371 Date: Dec. 14, 1999
  § 102(e) Date: Dec. 14, 1999
(87) PCT Pub. No.: WO98/45174
  PCT Pub. Date: Oct. 15, 1998

(30) Foreign Application Priority Data

Apr. 5, 1997 (GB) .............................. 9706984

(51) Int. Cl.[7] ............................... F26B 19/00
(52) U.S. Cl. ........................ 34/236; 34/60; 34/107; 53/225; 53/234; 53/251; 53/253; 198/450; 198/605
(58) Field of Search ........................ 34/60, 107, 236, 34/239; 53/225, 228, 234, 250, 251, 252, 253; 198/433, 448, 450, 605

(56) References Cited

U.S. PATENT DOCUMENTS

| | | | | |
|---|---|---|---|---|
| 4,330,976 A | * | 5/1982 | Blackall et al. ............... 53/151 |
| 4,428,177 A | * | 1/1984 | Focke et al. ................... 53/170 |
| 4,559,757 A | * | 12/1985 | Focke et al. ................... 53/176 |
| 4,942,715 A | * | 7/1990 | Focke .......................... 53/202 |
| 5,249,416 A | * | 10/1993 | Adams et al. ................. 53/463 |
| 5,544,467 A | * | 8/1996 | Focke ......................... 53/387.2 |
| 5,727,360 A | * | 3/1998 | Focke ......................... 53/387.2 |
| 5,758,468 A | * | 6/1998 | Focke et al. ................... 53/234 |
| 5,860,506 A | * | 1/1999 | Bailey et al. ............. 198/471.1 |
| 5,996,310 A | * | 12/1999 | Bailey et al. ................. 53/228 |
| 6,023,909 A | * | 2/2000 | Boldrini ...................... 53/234 |
| 6,098,533 A | * | 8/2000 | Polloni et al. ............... 101/3.1 |
| 6,186,313 B1 | * | 2/2001 | Spatafora et al. ........ 198/474.1 |

* cited by examiner

Primary Examiner—Pamela Wilson
(74) Attorney, Agent, or Firm—Antonelli, Terry, Stout & Kraus, LLP

(57) ABSTRACT

Holders (20) for articles such as newly-formed packets or groups of cigarettes are used to constrain and protect the articles while being conveyed by handling apparatus (22), e.g. in a packing machine (10). Holders (20) of similar external shape, adapted to interface with the handling apparatus, may be provided with differing internal features (28), adapted for receiving different articles, so that the articles may be readily conveyed by the same apparatus. The apparatus may be employed at the exit end of a cigarette packing machine to maintain the shape of newly-formed packets in a packet stabilising region. This region may comprise a reservoir including a series of compartmented drums (24,26) in which each compartment receives a line of abutting holders which is indexed in an axial direction during rotation of the drums.

24 Claims, 8 Drawing Sheets

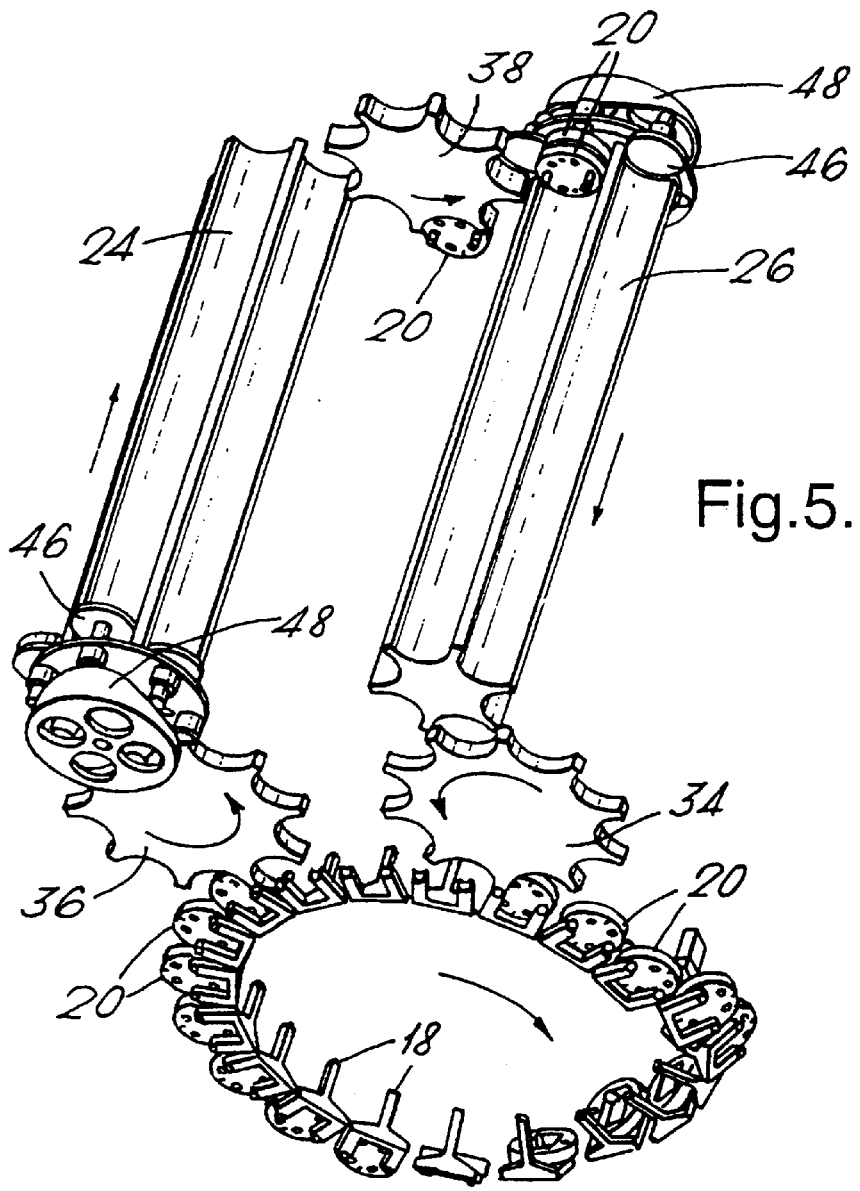
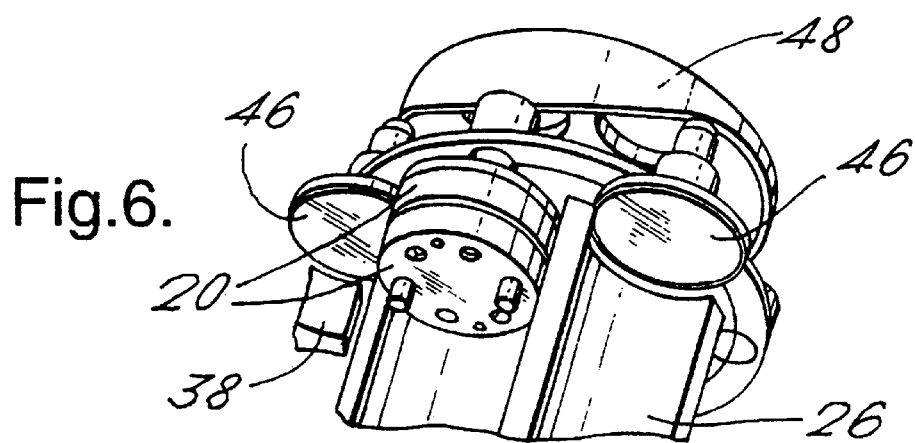

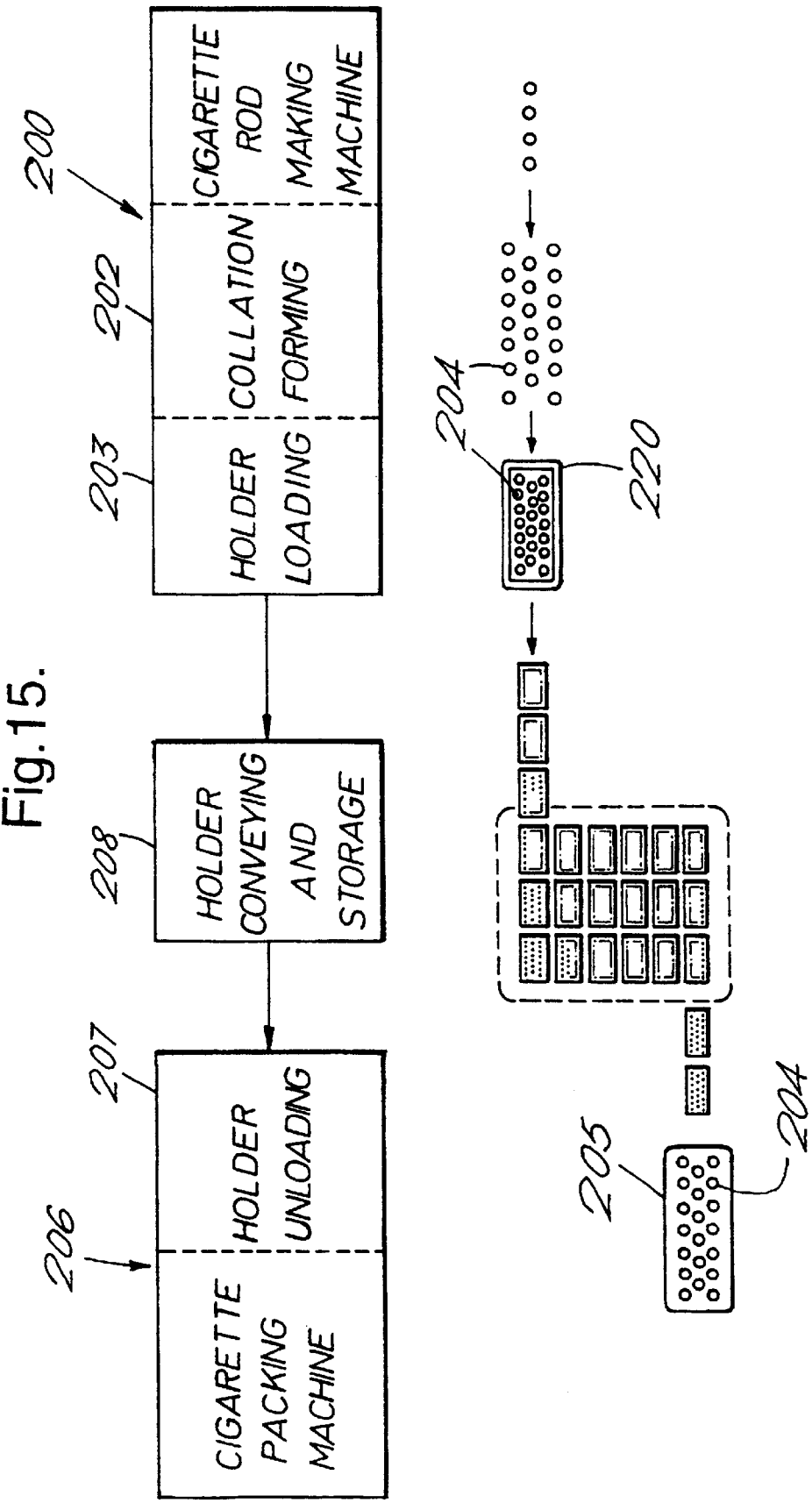

ARTICLE HANDLING APPARATUS

This invention relates to article handling apparatus, particularly but not exclusively apparatus forming part of a manufacturing system for articles of the tobacco industry such as cigarettes or cigarette packets.

Machines for packing cigarettes typically form and seal a packet blank around a bundle comprising a collation of cigarettes contained in a foil wrapper. For a relatively short time after formation it is necessary to constrain the newly-formed packet in its desired final shape until the adhesive used to seal the packet sets. For this reason such machines commonly have packet stabilising or drying regions including a drum or similar conveyor arranged at the exit end of the machine and which maintain the shape of the packet for a predetermined period before delivering it from the machine. In one of its aspects the present invention provides apparatus capable of use for this purpose.

According to a first aspect, the invention provides apparatus for handling articles of the tobacco industry, comprising a plurality of holders each having means for receiving at least one article, and conveyor means adapted to convey holders and including at least two conveyors arranged in series, whereby articles may be transferred between said conveyors while constrained and protected in a holder.

The articles could comprise newly-formed packets, so that the apparatus forms part of a drying station of a machine for packing cigarettes, particularly in hinged-lid packets. Alternatively, the articles could be groups of cigarettes formed into collations at or near a cigarette making machine, or bundles of wrapped collations of cigarettes ready for packing. Thus the apparatus could be provided between the collation former and the bundle former and/or between the bundle former and the packet former, and/or between the packet former and a delivery station (i.e. in this latter case as part of a packet drying station).

In all cases the receiving means of the holder preferably comprises a recess or other formation adapted to maintain the geometry or integrity of the article and to protect it during conveyance. The holders may preferably also be formed with features separate from said receiving means which are adapted to interface with the conveyor means. By loading the articles into holders which subsequently interface with conveying means further handling of the articles is effectively eliminated: this can be important in avoiding damage or degradation of delicate articles such as cigarettes or packets (particularly when newly-formed).

Conveying apparatus which handles articles in holders, which may be substantially rigid, is less prone to product-related faults, as the interface with the holders can be made more precise, with no variation in geometry as inevitably happens with articles such as cigarettes or packets. In addition, articles maintained and protected in holders may be handled in ways which would not be appropriate for handling unprotected articles, e.g. they may be stacked to increased levels without risk of crushing, and the holders may be subjected to increased impacts by pushers or the like. Additionally, the product itself may be handled better: for example, where the article is a collation of cigarettes conveyed from the vicinity of a cigarette making machine to a cigarette packing machine the occurrence of crossed cigarettes in the conveying path between the machines may be considerably reduced as compared with conventional forms of conveyance such as in a mass flow stream or in trays.

The holders may provide convenient temporary storage for articles in manufacturing processes. It is known in the tobacco industry to link machines with conveyor means which includes a variable capacity buffer reservoir between the machines so that one machine can continue to operate (at least temporarily) if the other machine stops for any reason. Thus, buffer reservoirs are commonly provided between linked cigarette making and packing machines and between cigarette packing and wrapping machines. Apparatus according to the present invention including conveyor means incorporating a buffer reservoir for holders may be employed in these positions or in any other positions between machines or parts of machines. The buffer reservoir may be of variable capacity.

Linking machines or parts of machines with apparatus incorporating conveyor means for holders can provide improved efficiency and flexibility. For example, the conveying apparatus need not be different for different sizes of article: holders of similar external shape may be used with different article receiving means, or the same holders could be used with a different article receiving means (e.g. a removable insert). Thus, where the apparatus is required to handle articles of different sizes this may be relatively easily achieved by replacement or modification of the holders.

According to another aspect, the invention provides apparatus for handling articles of the tobacco industry, including means for conveying a plurality of separable holders on an endless path adjacent the exit end of a cigarette packing machine, and means for loading newly-formed s packets into holders on said endless path, said conveying means being arranged to convey said packets in said holders through a packet stabilising or drying region. In a preferred arrangement the apparatus includes conveyor means (e.g. a fluted drum) for conveying a line of holders transversely, and means for advancing the line in a lengthwise direction during said transverse movement, so that holders may be successively loaded at one end of the line and removed from the other end of the line.

The invention will be further described, by way of example only, with particular reference to the accompanying diagrammatic drawings, in which:

FIG. 1 is a perspective view of a cigarette packing machine incorporating packet handling apparatus according to the invention, FIG. 2 is an enlarged perspective view of part of the packet handling apparatus of the machine shown in FIG. 1, FIG. 3 is an end view of the apparatus shown in FIG. 2, FIG. 4 is a side view of the apparatus in the direction of the arrow IV in FIG. 3, FIG. 5 is a perspective view of a modified packet handling apparatus, FIG. 6 is an enlarged view of part of the apparatus shown in FIG. 5, FIG. 7 is an end view of the apparatus shown in FIG. 5, FIG. 8 is a side view of the apparatus in the direction of the arrow VIII in FIG. 7, FIG. 9 is a perspective view from one side of one form of packet holder usable with the apparatus of FIG. 2 or FIG. 5, FIG. 10 is a perspective view from another side of the packet holder of FIG. 9, FIG. 11 is a perspective view of a different form of packet holder, FIG. 12 is a perspective view of part of another packet handling apparatus, FIG. 13 is a side view of another part of the apparatus of FIG.

FIG. 15 is a schematic plan of a cigarette making system incorporating handling apparatus according to the invention.

Figure 1:
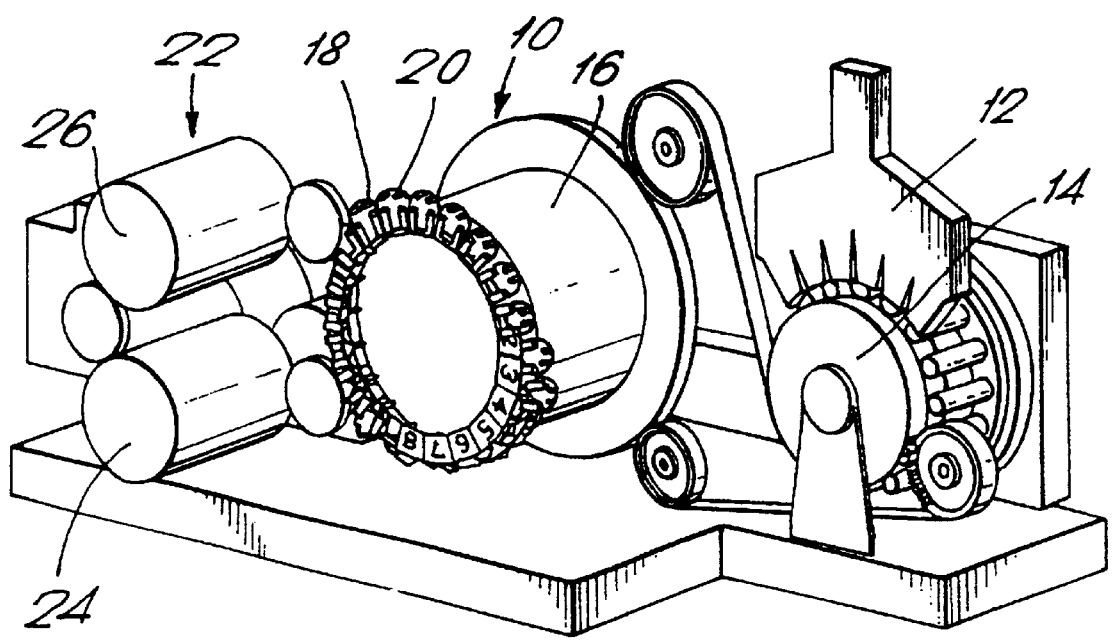

FIG. 1 shows a machine 10 for packing cigarettes in hinged-lid packets, comprising a hopper 12 in which cigarettes are received from a cigarette making machine (not shown), a collation drum assembly 14 in which groups of cigarettes received from the hopper are formed into collations for packing, and a packing process drum 16 on which the packet forming materials are wrapped and sealed around the collations. The detailed construction of the drum assembly 14 and process drum 16 forms no part of the invention of this application but may be substantially as described in patent applications Nos. PCT/GB97/03167 and PCT/GB97/03398, the disclosures of which are hereby incorporated herein in their entireties and to which reference is directed for further details.

The process drum 16 performs a packing process on the cigarette collations received from the collation drum assembly 14 at or near one end of the drum 16, during which process the collations and associated wrapping materials are progressed in a generally axial direction towards an exit end of the drum, on which are mounted a series of carriers 18 which, as explained in more detail below, convey individual packet holders or pucks 20 so as to receive newly-formed packets. The holders 20 are separable from the carriers 18 and convey the packets to a pack drying station 22, which includes pack drying drums 24 and 26, arranged in series.

Figure 9:
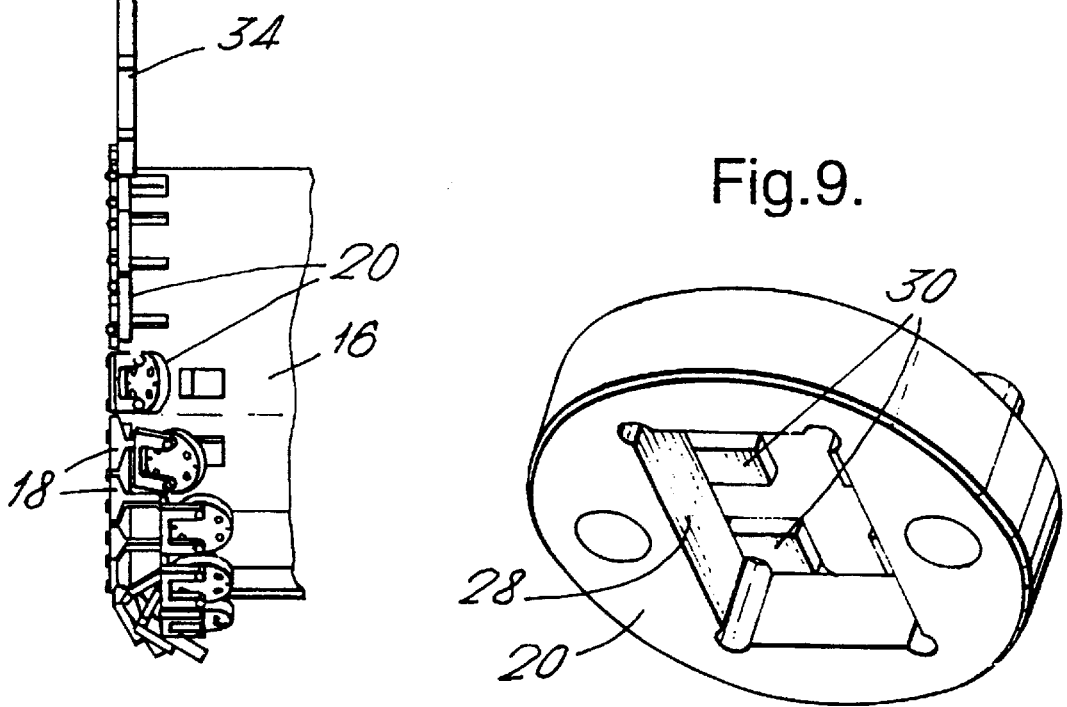
Figure 10:
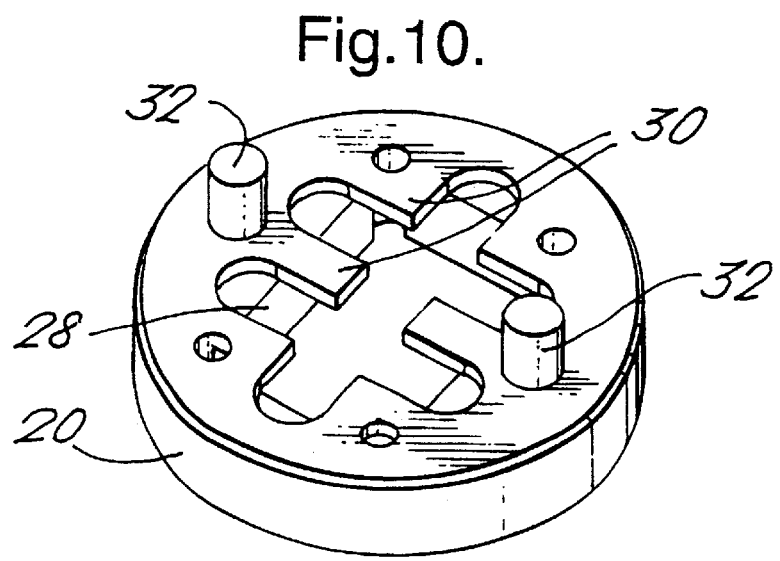

As shown in FIGS. 9 and 10, each packet holder 20 comprises a disc-like element having a substantially rectangular aperture 28 for receiving a packet. The aperture 28 extends through the holder but support fingers 30 extend partly across the aperture on one side and serve to support a packet in the aperture. Pins 32 extend from one side of each holder 20 and allow correct location and orientation of the holders during transfer to and from the drum 16 and in the pack drying station 22.

Figure 2:
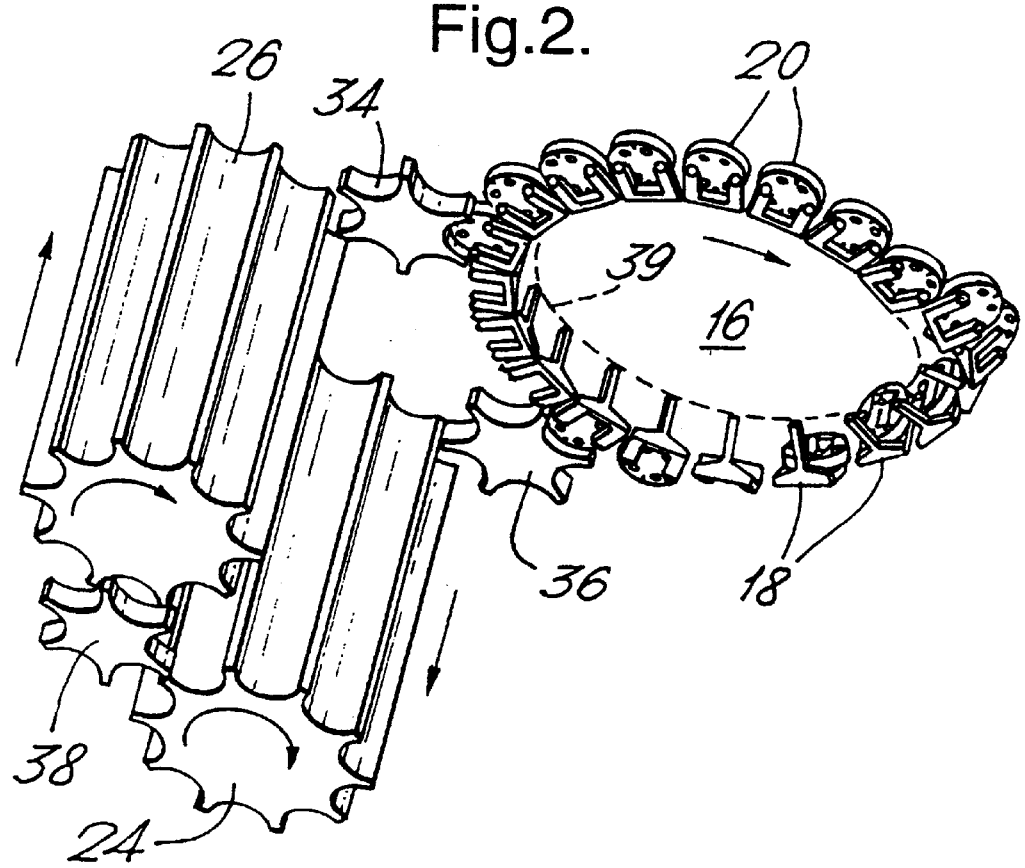
Figure 3:
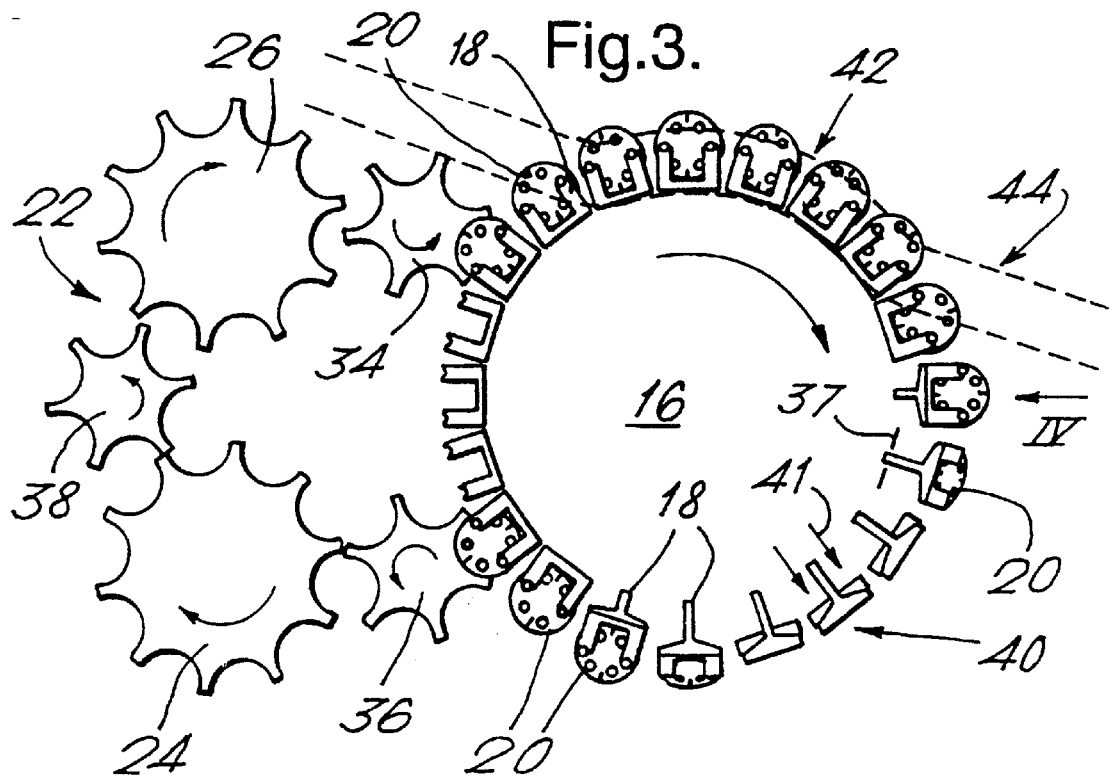
Figure 4:
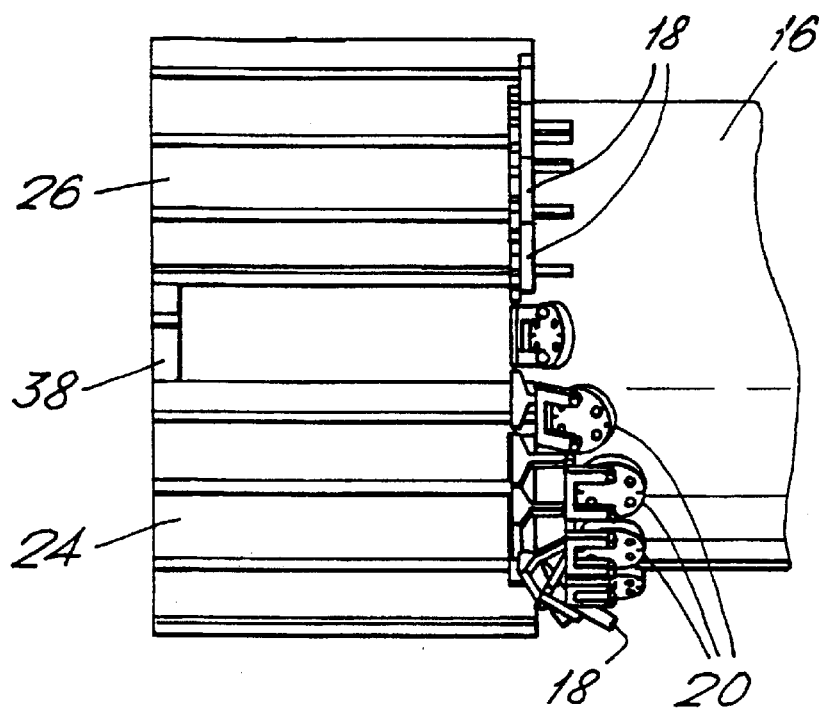
Figure 7:
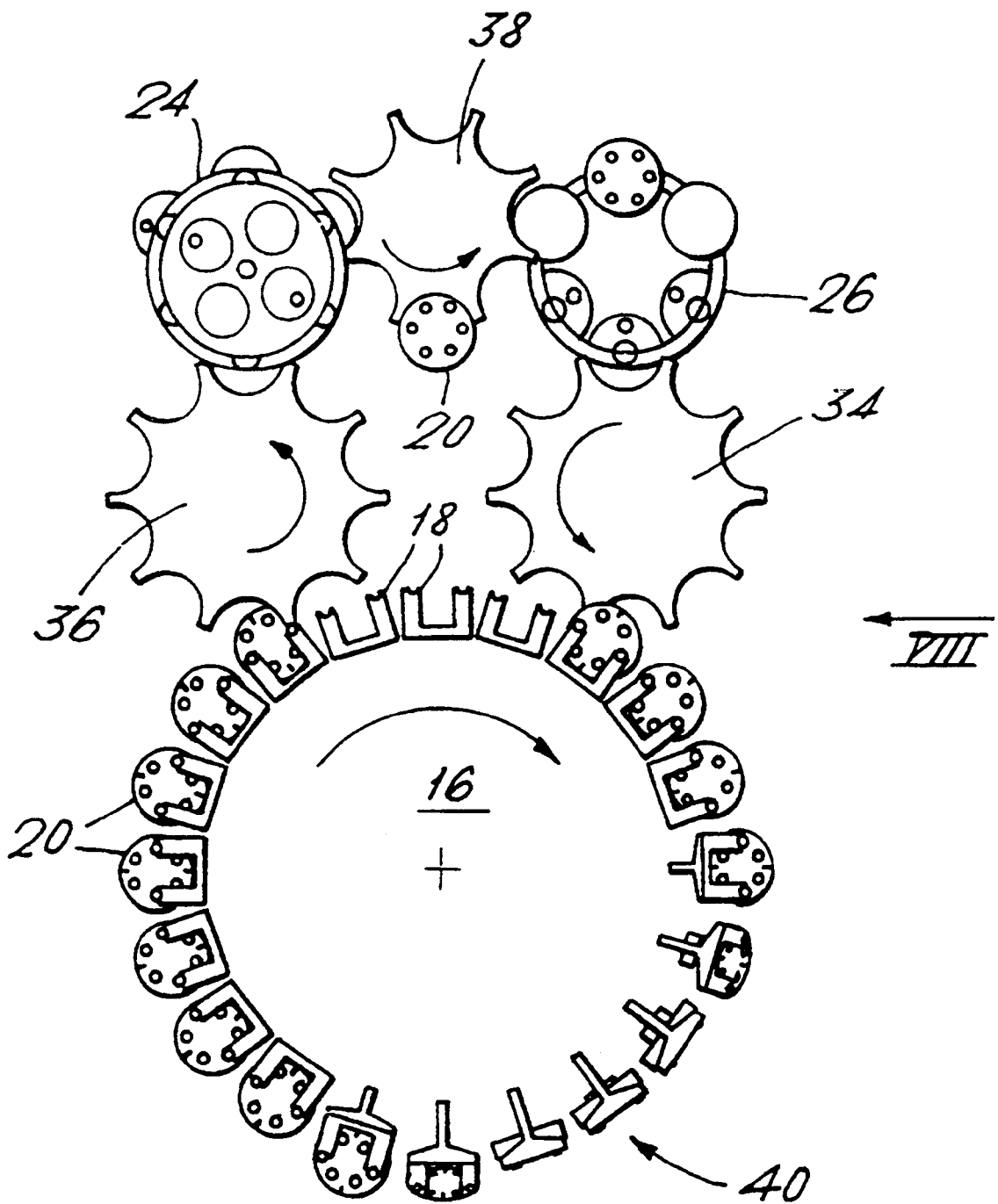
Figure 8:
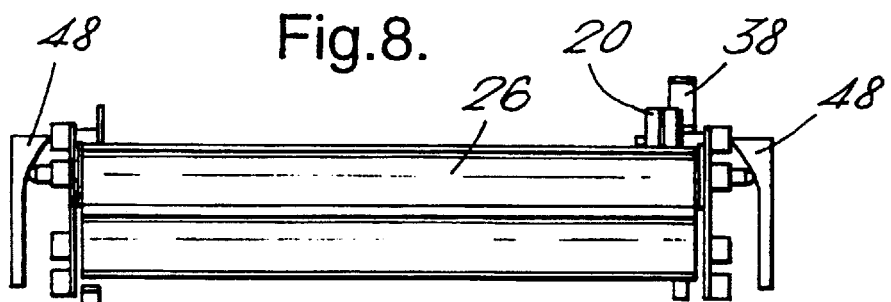

Referring now particularly to FIGS. 2–4, the carriers 18 on the drum 16 form part of a closed loop path for holders 20, which path includes also the pack drying drums 24,26 and transfer wheels 34,36 and 38. Individual positions for holders 20 are defined on this path, e.g. by the carriers 18 and flutes on the drums 24,26, and normally each position on the path is occupied by a holder. Holders 20 are received on the drum 16 from the transfer wheel 34 and are supported by the carriers 18 so that their axes are parallel to the axis of the drum 16. The carriers 18 are pivotally mounted on the drum 16 about substantially tangential axes (see pivot axis 37 for holder 20A in FIG. 3) and during rotation of the drum the carriers are pivoted by stationary cam means (indicated schematically at 39 in FIG. 2) so that at a loading position 40, substantially opposite the transfer wheel 34, the carriers assume a tangential orientation, i.e. with the axes of the holders 20 extending in a substantially radial direction. In this loading position 40, packets formed on the process drum 16 are transferred into each holder 20, e.g. by pusher means operating in a radially outward direction as indicated by the arrows 41 in FIG. 3. Once a packet is received in a holder 20 its shape is firmly maintained within the aperture 28 during its conveyance from the drum 16 through the drying station 22. It will be appreciated that a packet is loaded into each holder 20 as it reaches the loading position 40: thus, the drum 16 conveniently has the same number of packet processing stages as there are carriers 18.

Downstream of the loading position 40 the carriers 18 are pivoted by the cam 39 to their former position, so that holders 20 are arranged with their axes parallel to the axis of the drum 16. They are maintained in this orientation for transfer to the transfer wheel 36 and throughout the drying station 22. Transfer to the wheel 36 may be assisted by fixed guides (not shown); similarly, transfer between the other wheels or drums of the drying station 22 and the drum 16 may be assisted in the same way. The wheel 36 successively transfers holders 20 to the input ends of flutes of the drum 24. These flutes each contain a line of substantially abutting holders 20. During rotation of the drum 24 the line of holders 20 in each flute is advanced by one pitch (corresponding to the depth dimension of a holder), so as to cause the holder at the output end of each flute to transfer to the wheel 38 and creating space for receiving the next holder from the wheel 36. A stationary cam (not shown) may be used to advance the line of holders in each flute of the drum 24.

Holders 20 transferred to the transfer wheel 38 are transferred from the wheel to an input end of a flute of the drum 26, which is substantially identical in form and operation to the drum 24. Holders 20 are transferred from the output end of the flutes of the drum 26 back to the process drum 16 via the transfer wheel 34.

In the region of the process drum 16 immediately downstream of the transfer wheel 34, packets are pushed out of the holders 20 (e.g. by operation of plungers acting through the apertures 28) at an unloading position 42, so that the holders are empty before they reach the loading position 40. The packets may be plunged into a pocketed belt 44 which follows a path which is tangential to the drum 16 at the unloading position 42. As shown in FIG. 3, the path of the pocketed belt 44 may partially wrap around part of the drum 16 so that it lies parallel to that of the holders 20 for an extended region of the unloading position 42. In this respect it will be appreciated that in a preferred operative condition the drum 16 and belt 44 (as well as all the wheels and drums of the drying station 22) move continuously during operation (i.e. are not indexed). Indexed operation would be possible in a non-preferred operative condition.

Each of the flutes of the drums 24 and 26 contains up to 50 holders, so that each drum may contain up to 500 holders, each containing a newly-formed packet. At this capacity, even if the process drum 16 operates at 1,000 packets per minute (which is a very high speed for cigarette packing machines), the drying station 22 will give in excess of one minute between formation of packets and transfer to the belt 44. During this period the packets are firmly constrained in an ideal shape by the holder 20. The apertures 28 in the holders 20 may be provided with inserts to accommodate different sizes and shapes of packets.

FIGS. 5–8 show a slightly modified form of handling apparatus. Parts which are similar to those in the apparatus of FIGS. 2–4 have been given the same reference numbers. FIGS. 5 and 6 show details of a mechanism for moving the holders 20 along the flutes of the drum 24 and 26. At the input end of each respective flute there is a plunger 46 which is advanced and retracted by operation of a stationary cam 48 as the respective drum rotates. Alternatively the plungers 46 may be advanced by the cam 48 and retracted by operation of resilient means (not shown) which retains the plungers in contact with the cam. Thus, each of the holders 20 in a flute is indexed one pitch during the period while the flute rotates with its respective drum between the position at which it receives a holder 20 at its input end and the position at which a holder is transferred to the transfer wheel 38 or 34 from its output end. The lines of holders 20 in the drums 24 and 26 of the apparatus of FIGS. 2–4 may be advanced in the same way.

Figure 11:
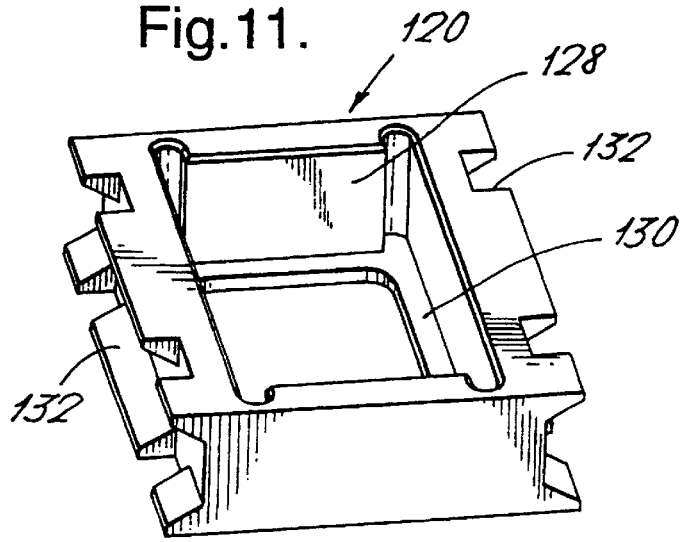

FIG. 11 shows a modified holder 120, which is substantially rectangular in external shape instead of circular. Although these shapes are preferred, other external shapes would be possible. The holder 120 includes an aperture 128, adapted to the size of a packet to be confined, ledges 130 to support the packet, and external formations 132 to aid location and engagement by conveying means such as the carriers 18.

Figure 12:
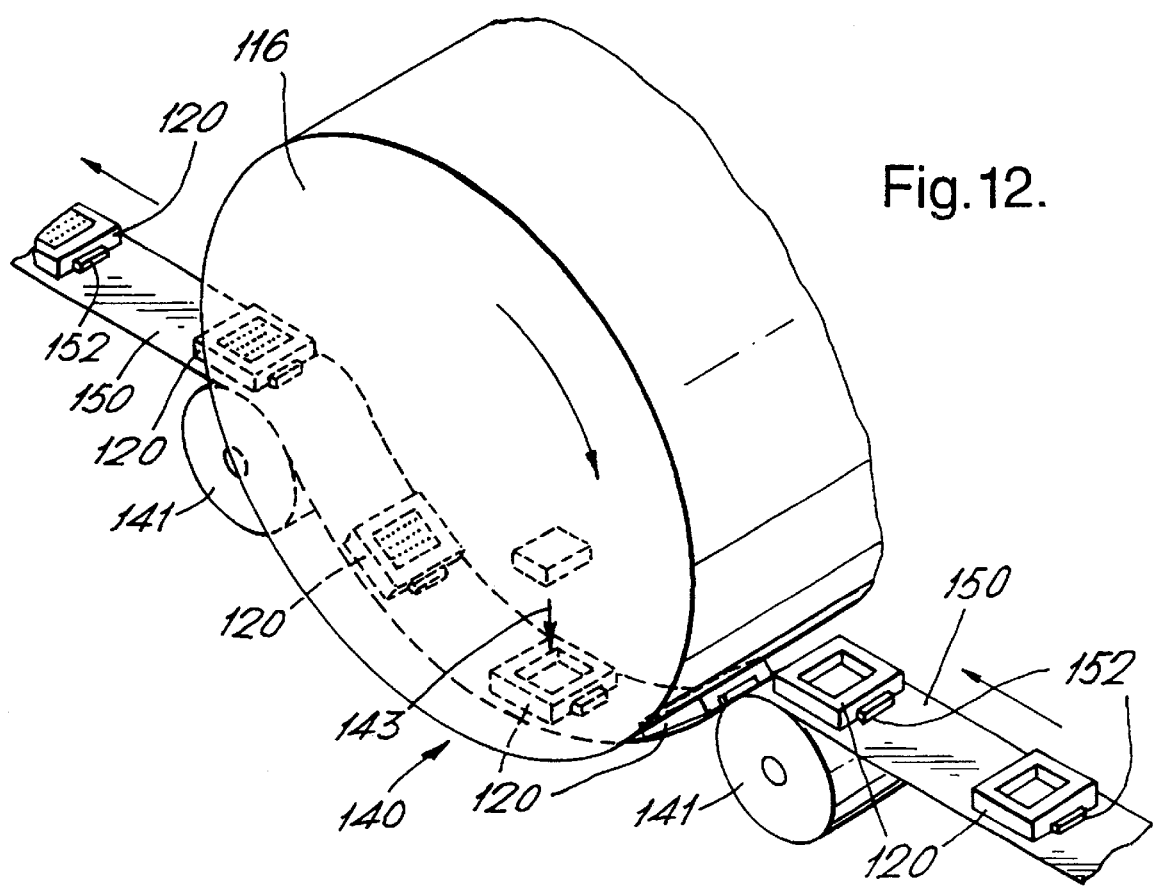

FIG. 12 shows an arrangement for loading packets into holders 120 in another packet handling apparatus, e.g, at the exit end of a cigarette packing machine. A flexible band 150, provided with regularly-spaced locations for holders 120, defined for example by lugs 152 attached to the belt, passes along a path which is substantially tangential to a packer process drum 116, the belt partially wrapping around the drum at a loading position 140 at which successive newly-formed packets are pushed in a radially outward direction into successive holders 120. The path of the belt 150 at the loading position 140 is defined by cooperation between the drum 116 and two substantially tangential guide rollers 141. A packet being pushed radially into a holder 120 at the loading position 140 is indicated at 143.

Figure 13:
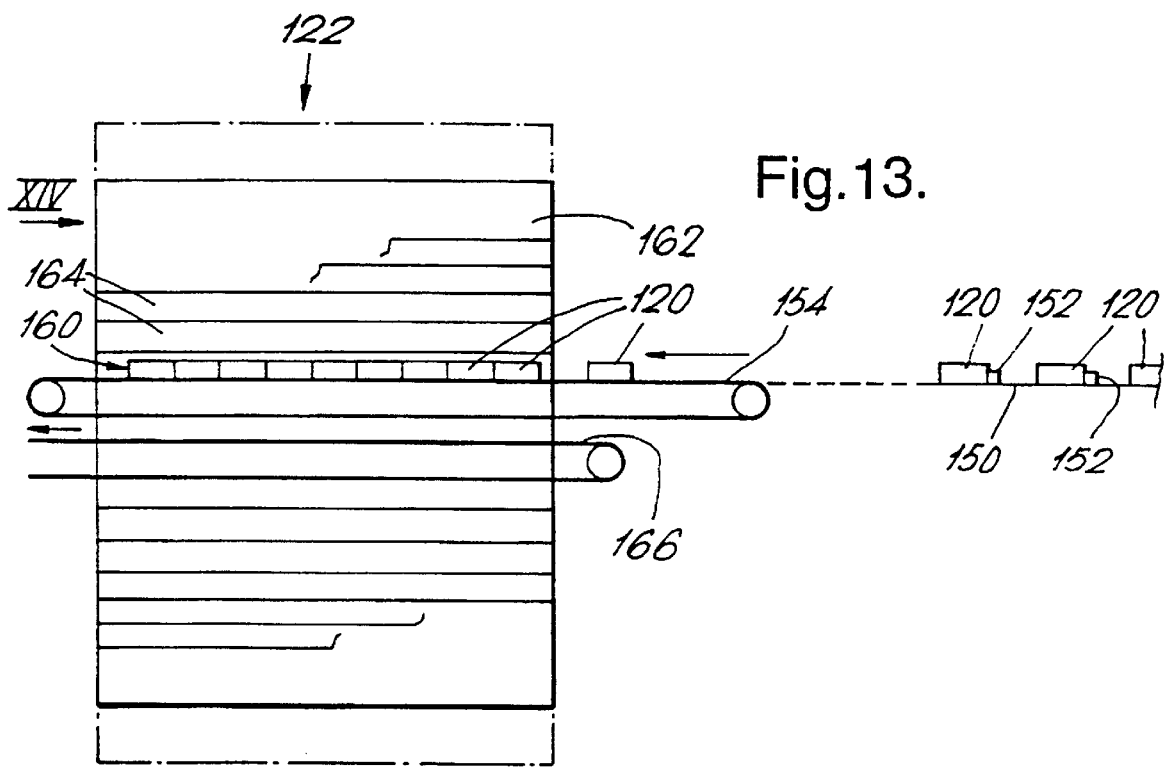
Figure 14:
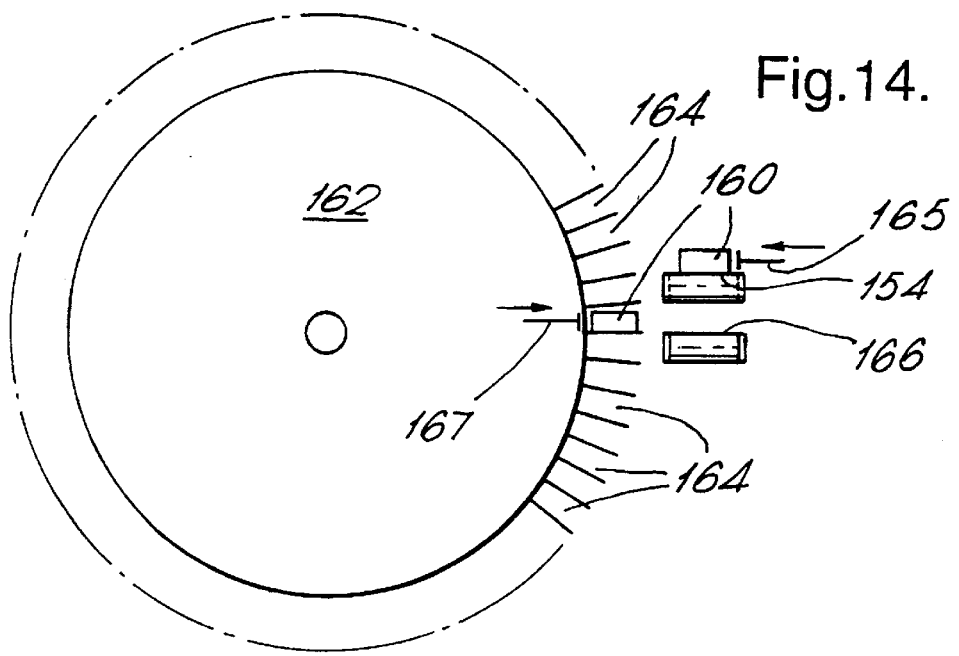
FIG. 14 is a view in the direction of arrow XIV in FIG. 13.

As shown in FIGS. 13 and 14, at a downstream position the belt 150 delivers the holders 120 to a further belt conveyor 154, on which the holders are formed into abutting groups 160. A drying station 122 comprising a drum 162 having a series of compartments 164, adapted to receive groups 160, is located alongside the conveyor 154. Thus, successive groups 160 may be plunged by pusher means 165 from the conveyor 154 into successive compartments 164 of the drum 162. The drum 162 is indexed between loading operations and groups 160 are subsequently conveyed by the drum 162 for almost a complete revolution before being unloaded by pusher means 167 which plunges the groups outwards from the compartments 164 onto a delivery conveyor 166 substantially immediately below the conveyor 154. The drying station 122 could comprise a series of conveyors (e.g. drums or belts) for conveying the groups 160, with groups being transferred between the conveyors in substantially the same way as they are transferred to and from the drum 162.

FIG. 15 shows a cigarette making and packing system in which holders 220 similar to the holders 20 or 120 may be used. Groups of cigarettes are formed in required collations at a cigarette making machine 200 which has a collation forming unit 202 for this purpose. The collations 204 are in the same form as required for packing into packets and are loaded into the holders 220, which maintain the required collation shape and protect the cigarettes, at a holder loading unit 203 at or adjacent the machine 200. Thereafter, the collations 204 are maintained in the holders 220 during conveyance to a cigarette packing machine 206, which includes a holder unloading unit 207. At the machine 206 the collations 204 are packed in packets 205. The path which the holders 220 follow from the making machine 200 to the packing machine 206 may include a variable capacity buffer reservoir 208 which may be allowed to expand or contract when the supply from the making machine and the demand of the packing machine are not matched (e.g. when one of the machines is temporarily stopped). The arrangement may be regarded as a development of the arrangement disclosed in British patent specification No. 943,347, in which collations are delivered, stored and conveyed in multi-cellular carriers. Reference is directed to this specification, particularly for details of conveying, handling and storing arrangements which may be applicable to the present invention.

The holders 20, 120 or 220 could incorporate graduations or other markings to act as a gauge to provide a visual check of quality of the packet Similarly, any of the holders could incorporate compliant inserts to reduce the noise and/or shock of loading, either of the packets or the holders themselves.

What is claimed is:

1. Apparatus for handling articles of the tobacco industry, comprising a plurality of holders each having means for receiving at least one article, and conveyor means to convey said plurality of holders and including at least two conveyors arranged in series, whereby articles may be transferred between said conveyors while constrained and protected in a holder of said plurality of holders.

2. Apparatus as claimed in claim 1, wherein the receiving means of each holder comprises means defining a formation adapted to maintain the geometry or integrity of the article during conveyance.

3. Apparatus as claimed in claim 1, wherein the receiving means include a recess adapted to the shape of the article.

4. Apparatus as claimed in claim 1, wherein the receiving means is defined by an insert separable from said holder.

5. Apparatus as claimed in claim 1, wherein said receiving means is adapted to receive an article having a rectangular section.

6. Apparatus as claimed in claim 1, wherein each holder has at least one feature separate from said receiving means and adapted to interface with the conveyor means or with other holders.

7. Apparatus as claimed in claim 6, wherein said feature includes spacer means.

8. Apparatus as claimed in claim 1, wherein each holder means has a circular periphery.

9. Apparatus as claimed in claim 1, wherein at least one of said conveyors comprises a buffer reservoir for articles in holders.

10. Apparatus as claimed in claim 1, including loading means for loading an article comprising a plurality of rod-shaped articles contained in folded packaging material into successive holders conveyed to said loading means by said conveyor means.

11. Apparatus as claimed in claim 10, wherein the loading means comprises means for loading newly-formed packets, and the conveying means includes an endless path for holders including a packet stabilising or drying region.

12. Apparatus for handling articles of the tobacco industry, including means for conveying a plurality of separable holders on an endless path adjacent to the exit end of a cigarette packing machine, and means for loading newly-formed packets into said holders on said endless path, said conveying means being arranged to convey said packets in said holders through a packet stabilizing or drying region.

13. Apparatus as claimed in claim 12, including means for presenting each said holder at a defined orientation at said loading means.

14. Apparatus as claimed in claim 13, including means for changing the orientation of said holder during conveyance to and from said loading means.

15. Apparatus a claimed in claim 13, wherein said conveying means includes rotary means and said loading means includes means for loading successive packets into said holders in a direction which is substantially radial relative to said rotary means.

16. Apparatus as claimed in claim 12, including means for unloading said holders on said endless path.

17. Apparatus as claimed in claim 12, wherein said conveying means includes a rotary member having a series of receiving positions, each of said receiving positions being arranged to receive a group of holders extending in a line substantially parallel to the axis of the rotary member.

18. Apparatus as claimed in claim 17, wherein said conveying means includes means for transferring said holders to said receiving positions at one end of each of said receiving positions and means for delivering said holders from the opposite end of each of said receiving positions.

19. Apparatus as claimed in claim 18, including means for indexing a line of said holders in a an axial direction on rotation of said rotary member.

20. Apparatus as claimed in claim 19, wherein said indexing means includes stationary cam mans cooperating with each of said receiving positions as said rotary member is rotated.

21. Apparatus as claimed in claim 19, wherein each of said line of holders is advanced one pitch during each rotation of said rotary member whereby each said line of holders receives a holder of said holders from said transferring means and delivers a previously-received holder of said holders to said delivering means during each rotation of said rotary member.

22. Apparatus as claimed in claim 17, wherein the conveying means includes means for conveying a line of holder transversely, and means for advancing the line in a lengthwise direction during said transverse movement, so that said group of holders may be successively loaded at one end of the line and removed from the other end of the line.

23. Apparatus as claimed in claim 22, wherein said conveying means includes first and second endless conveyors arranged in series and means for transferring holders between said conveyors, said respective advancing means being arranged to advance the line of holders on said conveyors in opposite directions.

24. Apparatus as claimed in claim 17, including means for transferring groups of holders to or from each of said receiving position in a direction which is substantially radial relative to the axis of the rotary member.

\* \* \* \* \*